United States Patent [19]

Erlandsson

[11] Patent Number: 4,485,746
[45] Date of Patent: Dec. 4, 1984

[54] ENERGY RECOVERY SYSTEM FOR AN INCINERATOR

[75] Inventor: Kjell I. Erlandsson, Milwaukee, Wis.

[73] Assignee: Kelley Company, Inc., Milwaukee, Wis.

[21] Appl. No.: 553,358

[22] Filed: Nov. 18, 1983

Related U.S. Application Data

[63] Continuation-in-part of Ser. No. 327,793, Dec. 7, 1981, abandoned.

[51] Int. Cl.³ .............................................. F23B 7/00
[52] U.S. Cl. .................................... 110/234; 110/162; 110/346; 122/7 R; 122/20 B; 122/421; 165/DIG. 2
[58] Field of Search ............... 110/234, 160, 162, 163, 110/346; 122/20 A, 20 B, 420, 421, 422, 7 R, 7 A; 165/DIG. 2, 32, 33, 40.1

[56] References Cited

U.S. PATENT DOCUMENTS

| | | | |
|---|---|---|---|
| 1,050,134 | 1/1913 | Hegeler | 122/7 R |
| 1,707,964 | 4/1929 | McKelvy et al. | 122/7 R |
| 3,227,141 | 1/1966 | Fahie | 122/7 A |
| 3,366,163 | 1/1966 | Scharbrough | 165/1 |
| 3,395,512 | 3/1966 | Finney, Jr. | 122/7 A |
| 3,416,470 | 11/1969 | Hey et al. | 122/7 A |
| 3,526,268 | 9/1970 | Robinson | 165/1 |
| 3,844,233 | 10/1974 | Fishback | 110/234 X |
| 4,113,005 | 9/1978 | Cantrell | 122/7 R |
| 4,210,102 | 7/1980 | Dosmann | 165/DIG. 2 |
| 4,354,440 | 10/1982 | McRee, Jr. | 110/346 |

FOREIGN PATENT DOCUMENTS 456229 2/1928 Fed. Rep. of Germany ...... 122/420

Primary Examiner—Edward G. Favors
Attorney, Agent, or Firm—Andrus, Sceales, Starke & Sawall

[57] ABSTRACT

An energy recovery system for an incinerator. Hot flue gases from the incinerator are discharged into a vertical stack and the lower end of the stack is connected through an auxiliary conduit to a heat exchanger, such as a steam or hot water boiler. An induced draft fan draws the hot flue gases through the conduit and boiler to generate steam or hot water and a damper is located within the conduit. A fuel burner is connected in the conduit and operates to supply heat to the boiler during periods when the incinerator is not operating. A first flow sensing mechanism is located in the conduit upstream of the boiler, while a second flow sensing mechanism is positioned in the stack downstream of the connection of the stack and the conduit. In the incinerator mode of operation, the second flow sensing mechanism controls the damper in a manner to obtain a substantially zero flow of waste gas through the stack to the atmosphere to insure that all of the waste gas from the incinerator is directed through the conduit to the boiler. During periods when the incinerator is not operating, the burner mode of operation is established and the first flow sensing mechanism controls the damper to obtain substantially zero flow of gas upstream of the burner so that all of the heat from the burner will be directed to the boiler.

16 Claims, 1 Drawing Figure

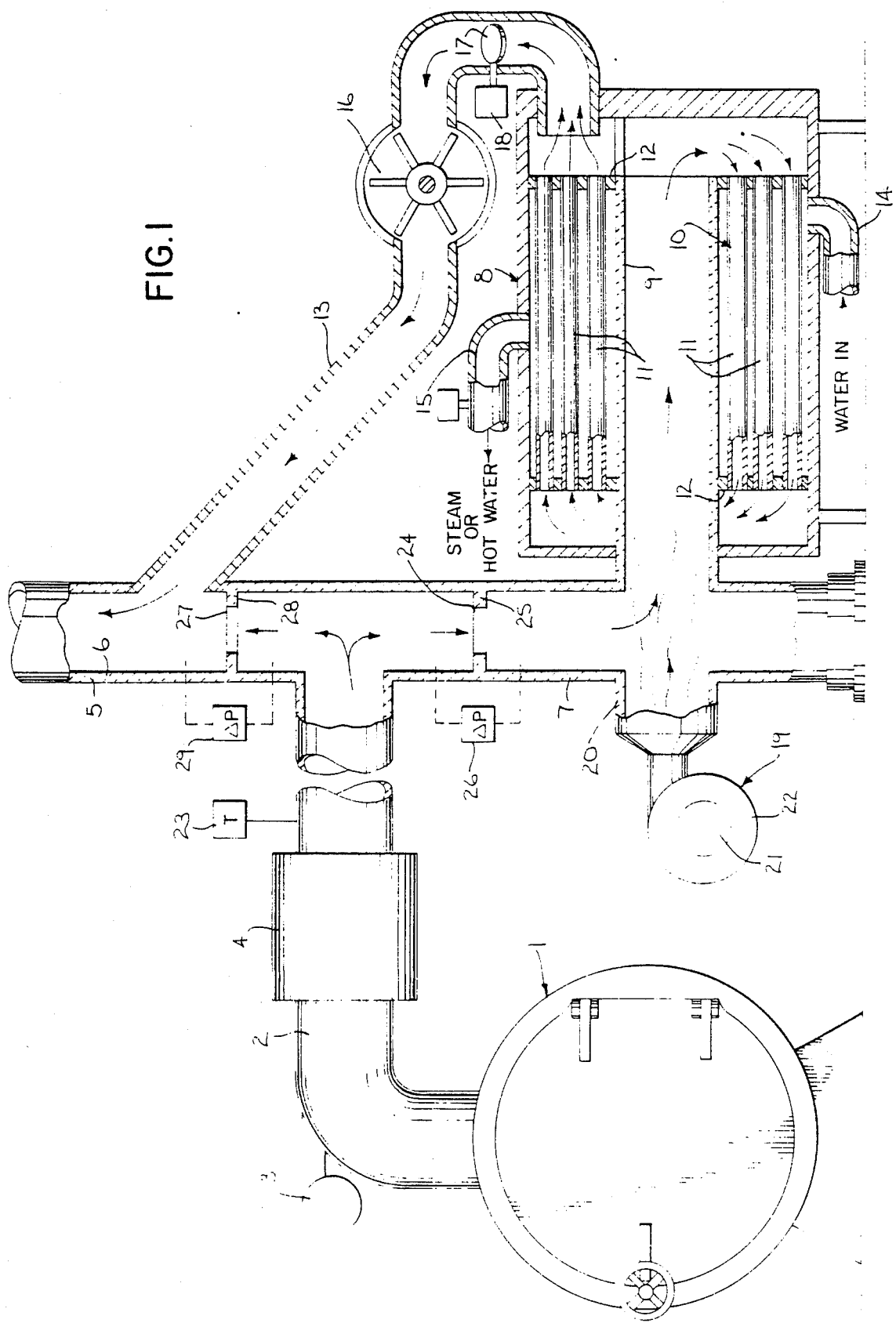

ENERGY RECOVERY SYSTEM FOR AN INCINERATOR

BACKGROUND OF THE INVENTION

This application is a continuation-in-part of application Ser. No. 06/327,793, filed Dec. 7, 1981 abandoned.

BACKGROUND OF THE INVENTION

Industrial or commercial incinerators that burn waste or trash provide a source of energy that can be utilized to heat a fluid, such as air or water, in an energy recovery system. In a conventional energy recovery system, as used in the past, hot flue gases from the incinerator were discharged into a vertical stack and the lower end of the stack was connected to a steam or a hot water boiler, so that a portion or all of the flue gases could be drawn through the boiler to heat the water. In the conventional system, a fan was located in the gas discharge line from the boiler and served to draw the gases through the boiler and the flow of gas was controlled by a damper located in the discharge line. The damper, in turn, was controlled by the boiler pressure, in the base of a steam boiler, and boiler temperature, in the case of a hot water boiler, with the flow of flue gas being varied to maintain the desired thermal characteristics of the boiler.

The conventional energy recovery systems, as described above, were capable of generating steam or hot water only during periods when the incinerator was operating, and during periods when waste was not being burned in the incinerator, as for example overnight or weekends, no steam was generated. Thus, the incinerator heat recovery system could not be relied on to supply all of the steam or hot water requirements, and auxiliary steam or hot water generating facilities were normally required.

SUMMARY OF THE INVENTION

The invention is directed to an improved energy recovery system for an incinerator. According to the invention, hot flue gases from the incinerator are discharged into a vertical stack and an auxiliary heating conduit or duct is connected to the lower portion of the stack. A heat exchanger, such as a steam or hot water boiler, is connected in the auxiliary heating duct and the hot flue gases are selectively directed from the stack through the auxliary heating duct and serve to heat the water in the heat exchanger.

To draw the waste gases from the stack to the heat exchanger, a fan or blower is located in the boiler exhaust duct and a damper controls the flow of gas through the duct.

In accordance with a feature of the invention, a fuel burner is located in the auxiliary heating duct adjacent the heat exchanger or boiler and operates to heat the water in the boiler during periods when the incinerator is not operating, or when the incinerator cannot supply the heat requirements for the boiler. Located in the auxiliary heating duct, upstream of the fuel burner, is a mechanism for measuring the direction of gas flow, which can take the form of an orifice in the duct. The pressure differential across the orifice is continuously monitored to provide an indication of the direction of gas flow at this location.

A second flow measuring device is located in the stack downstream of the connection of the auxiliary heating duct with the stack. The second flow measuring device can also take the form of an orifice and the pressure differential across the orifice constitutes a measurement of the direction of gas flow at that location.

When the incinerator is operating, and the temperature in the stack is above a predetermined setting, the second flow measuring device will operate the damper to maintain a substantially zero flow of waste gas through the stack to the atmosphere, or alternately, a very slight downflow, to insure that all of the heated waste gas from the incinerator will be directed through the auxiliary heating duct to the boiler.

when the incinerator is not operating, or is operating at a low level, and the stack temperature falls beneath the predetermined setting, the first flow measuring device in the auxiliary heating duct comes into play. At this time the burner will operate to supply heat to the boiler and the first flow measuring device will operate the damper to maintain a substantially zero flow of gas in the portion of the auxiliary heating duct upstream of the burner, or alternately, a slight positive pressure differential in a direction from the stack to the boiler. This positive pressure differential provides a slight downflow of gas in the auxiliary heating duct and prevents the heated gas from the burner from going directly to the stack, thus insuring that the heated burner gases will be fully utilized to heat water in the boiler.

The energy recovery system of the invention, by incorporating a fuel burning unit with the incinerator, can be operated to generate steam or hot water during periods when the incinerator is not operating, or is operating at a low level.

During the incinerator mode, when the incinerator is supplying heat to the boiler, the flow of hot flue gases through the stack is controlled so that substantially all of the heated gas will be directed to the boiler to heat the water. Durig the burner mode, when the incinerator is not operating, or is operating at a low level, the flow of gas in the auxiliary heating duct upstream of the burner is monitored so that there is substantially zero flow of gas in the auxiliary heating duct upstream of the burner, thereby insuring that all of the heated gas from the burner will be directed to the boiler. Thus, the flow of heated gas is controlled in both the incinerator and boiler mode of operation to provide optimum efficiency for the system.

Other objects and advantages will appear in the course of the following description.

DESCRIPTION OF THE DRAWINGS

The drawing illustrates the best mode presently contemplated of carrying out the invention.

FIG. 1 is a schematic representation of the energy recovery system of the invention.

DESCRIPTION OF THE ILLUSTRATED EMBODIMENT

As shown in the drawing, a conventional incinerator 1 is employed to burn waste material and the hot waste gases are discharged from the incinerator through conduit 2. A conventional fuel burner 3 is connected to conduit 2 and serves to burn the combustible portion of the waste gases in a secondary zone of combustion in thermal reactor 4. The resulting flue gases, consisting primarily of carbon dioxide and water vapor, are discharged into the central portion of a vertical stack 5 which is provided with a refractory lining 6. Conduit 2 in combination with stack 5 constitutes a discharge conduit for discharging the waste gases from incinerator 1 to the atmosphere.

The lower portion of stack 5 constitutes an auxiliary heating duct 7 which is connected to a boiler or heat exchanger 8. Boiler 8 is conventional in construction and in itself forms no part of the invention. As shown in the drawings, the boiler is a three pass type having a central conduit 9 connected to duct 7 and located centrally of a tube bundle 10. Tube bundle 10 consists of a plurality of tubes 11 connected at their ends by headers 12. As shown in FIG. 1, the flue gases pass from the auxiliary heating duct 7 into the central conduit 9, then flow in a reverse manner through one half of the tubes 11 in bundle 10 and then reverse their flow through the other half of the tubes 11 for discharge through the outlet duct or conduit 13. As shown in the drawing, the conduit 13 can be connected to stack 5 at a location above, or downstream, of the connection of conduit 2 with stack 5.

A fluid to be heated, such as water, is introduced into boiler 8 through an inlet 14, and the heated fluid such as steam, or hot water, is withdrawn through the outlet 15.

To draw the flue gases through the auxiliary heating duct 7 and through boiler 8, a conventional induced draft fan or blower 16 is located within outlet conduit 13, and a movable damper 17 is positioned upstream of blower 16, between the blower and the boiler 8. Damper 17 is controlled in a conventional manner by motor 18. Alternately, instead of utilizing blower 16 and damper 17, a variable speed blower can be utilized.

A fuel burning unit 19, such as a gas burner unit, is mounted in an extension 20 that is connected to the auxiliary heating duct 7 and is located in alignment with the central tube 9 of the boiler 8. Burner unit 19 is a conventional type and includes a gas burner 21 and an air supply blower 22 which supplies air for the combustion of the gas or other fuel. As shown in FIG. 1, the flame from burner 19 is directed across the auxiliary heating duct 7 and into the horizontal conduit 9 of boiler 8.

Burner unit 19 is adapted to be operated during periods when the incinerator 1 is not operating, or during periods when the combustion within the incinerator is at a low level and is not supplying sufficient heat to the boiler to maintain the steam or water pressure at the desired level.

A conventional temperature sensor 23 is located in conduit 2, downstream of thermal reactor 4, and if the temperature as measured by sensor 23 is below a preset value, as for example 500° F. the burner mode of operation is established.

In the burner mode of operation, the damper 17 controls the flow of gas through the boiler 8 and operation of the damper is controlled by a mechanism which senses the direction of gas flow within the auxiliary heating conduit 7 upstream of the burner unit 19. In the preferred form of the invention, as shown in the drawing, the flow measuring mechanism comprises an orifice means, such as an orifice 24, which is defined by a ring 25 formed of refractory material and secured to the inner surface of the auxiliary heating conduit 7. The pressure differential across the orifice is measured by a conventional pressure differential switch 26, such as that sold under the tradename Series 3000 Photohelic (Dwyer Instruments Inc.). It is desired to maintain a substantially zero flow at the position of orifice 24, or alternately a small positive pressure differential across the orifice, meaning that the pressure above the orifice is greater than the pressure below the orifice so there will be a very slight downward flow of gas through the auxiliary heating conduit 7 toward the burner unit 19. Preferably the pressure differential is maintained within the range of 0.00 to 0.02 inch of water. Maintaining the pressure differential within this range insures that the heated gases generated by burner unit 19 will be directed through boiler 8 and will not be discharged directly from stack 5 to the atmosphere. In addition, maintaining the pressure differential within the above-mentioned range insures that excessive volumes of cold air will not be drawn downwardly through stack 5 through the the auxiliary heating duct 7 to boiler 8 when the incinerator is not operating which could reduce the efficiency of the boiler heating operation.

When the temperature in conduit 2, as determined by sensor 23, is above the predetermined setting, such as 500° F., the burner mode of operation may be discontinued, and the incinerator mode can be established. In this mode, the heated flue gases from the incinerator are directed to boiler 8 to heat the fluid therein. Under these conditions of operation, the position of the damper is controlled by a second flow sensing device which can take the form of an orifice 27 defined by a ring 28 formed of refractory material and attached to the inner surface of stack 5. The pressure differential across orifice 27 is measured by a pressure differential switch 29 in the same manner as that described with respect to orifice 24. It is desired to maintain a small positive pressure differential across orifice 27, meaning that the pressure above the orifice is greater than the pressure below the orifice, so there will be substantially zero flow, or a very slight downward flow of gas within the stack at the location of orifice 27. As in the case of orifice 24 the pressure differential is preferably maintained within the range of 0.00 to 0.02 inch of wter. Maintaining the pressure differential within this range insures that the heated gases generated by the incinerator will be directed through the auxiliary heating conduit 7 to the boiler 8 and will not be discharged directly through stack 5 to the atmosphere, thereby increasing the efficiency of the heating operation.

The invention also allows the boiler 5 to be fired by burner 19 and incinerator 1 simultaneously, in case the incinerator is unable to provide the heat necessary to maintain output demanded from the boiler. In this mode, damper 17 is controlled by orifice 27 to maintain substantially zero flow through orifice 27 and burner 19 is controlled by the steam or water temperature in the boiler.

The invention provides an improved heat recovery system which insures that substantially all of the hot flue gases from the incinerator will be directed to the boiler to heat the heat transfer medium therein. During conditions when the incinerator is not operating, or is not generating sufficient output to supply the required heat to the boiler, the auxiliary burner unit comes into play and the system again insures that all of the heat output of the burner is supplied to the boiler.

It is contemplated that in some installations only the incinerator mode of operation will be used, without an auxiliary burner unit 19, and in that case the flow sensing mechanism 24 would not be utilized.

While the above description has illustrated the invention as used with the waste gases of an incinerator, it is contemplated that the invention can be associated with any source of heated gas.

Various modes of carrying out the invention are contemplated as being within the scope of the following claims particularly pointing out and distinctly claiming the subject matter which is regarded as the invention.

I claim:

1. An energy recovery system, comprising means to generate heated gas, stack means connected to the said first name means for conducting said gas to the atmosphere, auxiliary conduit means connected to said stack means, heat exchanger means disposed in said auxiliary conduit means for transferring heat from said gas to a heat transfer fluid, flow sensing means disposed in said stack means downstream of the connection of said auxiliary conduit means with said stack means for sensing the direction of gas flow in said stack means, flow inducing means for inducing a flow of gas in said conduit means in a direction from said stack means to said heat exchanger means, flow control means disposed in said conduit means for controlling the flow of gas through said conduit means, and means operably connecting said flow sensing means with said flow control means to obtain a substantially zero flow of gas in said stack means at the location of said flow sensing means to thereby insure that substantially the entire flow of said flue gas is directed through said auxiliary conduit means to said heat exchanger means.

2. The system of claim 1, wherein said flow sensing means comprises an orifice disposed in said stack means, and means for measuring the pressure differential across said orifice.

3. The system of claim 2, and including an annular member disposed on the inner surface of said stack means and defining said orifice.

4. The system of claim 1, wherein said flow control means comprises a damper disposed in said conduit means.

5. The system of claim 4, wherein said damper is located downstream of said heat exchanger means.

6. The system of claim 1, and including fuel burning means operably associated with said heat exchanger means, and second flow sensing means for sensing the direction of gas flow in said conduit means at a location between said stack means and said heat exchanger means, and operating means operably connecting said second flow sensing means with said flow control means during periods when said incinerator is not capable of supplying the full heat demand to said heat exchanger, for obtaining a substantially zero flow of gas in said conduit means at the location of said second flow sensing means to thereby insure that substantially the entire flow of heated gas from said fuel burning means is directed through said conduit means to said heat exchanger means.

7. The system of claim 6, wherein said second flow sensing means comprises an orifice disposed in said conduit means, and means for measuring the pressure differential across said second orifice.

8. The system of claim 6, and including temperature sensing means disposed in said stack means at a location upstream of the connection of said conduit means to said stack means, said temperature sensing means being operably connected to said fuel burning means to operate said fuel burning means when said temperature in said stack means falls below a preset value.

9. An energy recovery system, comprising an incinerator to burn waste material and having a discharge outlet to discharge hot flue gases from the incinerator, stack means connected to the discharge outlet for conducting said gases to the atmosphere, auxiliary conduit means connected to said stack means, heat exchanger means disposed in said conduit means for transferring heat from said flue gases flowig through said conduit means to a heat transfer fluid, flow inducing means for inducig a flow of gas in said conduit means in a direction from said stack means to said heat exchanger means, fuel burning means operatively associated with said heat exchanger means to heat the heat transfer fluid therein, flow sensing means disposed in said conduit means upstream of said heat exchanger means for sensing the direction of gas flow in said conduit means, flow control means disposed in said conduit means for controlling the flow of gas through said conduit means, and means operably connecting said flow sensing means with said flow control means to obtain a substantially zero flow of gas in said conduit means at the location of said flow sensing means to thereby insure that substantially the entire flow of heated gas from said burner means is directed through said conduit means to said heat exchanger means.

10. The system of claim 9, and including temperature sensing means disposed in said stack means upstream of the connection of said conduit means to said stack means, and means operably connecting the temperature sensing means with said burner means for operating said burner means when the temperature in said stack means falls below a preset value.

11. A method of energy recovery, comprising the steps of burning waste material in an incinerator, discharging the waste gas of combustion through a stack, connecting the stack through an auxiliary conduit with a heat exchanger, inducing a flow of gas in said conduit in a direction from said stack to said heat exchanger, sensing the direction of flow of waste gas in the stack at a location downstream of the connection of said conduit to said stack, sensing the temperature of the waste gases in said stack at a position upstream of said connection and controlling the flow of waste gas through said conduit when the temperature in said stack is above a predetermined value to maintain a substantially zero flow of gas at said location so that substantially all the waste gas from the incinerator is directed through said conduit to said heat exchanger to heat a heat transfer fluid therein.

12. A method of energy recovery, comprising the steps of burning waste material in an incinerator, discharging the waste gas of combustion through a stack, connecting the stack through an auxiliary conduit with a heat exchanger, sensing the direction of flow of gas in the stack at a location downstream of the connection of said auxiliary conduit to said stack, and controlling the flow of waste gas through the auxiliary conduit to maintain a substantially zero flow of gas at said location so that substantially all of the waste gas from the incinerator will be directed through said auxiliary conduit to said heat exchanger, and transferring heat in the heat exchanger from said waste gas to a heat transfer medium.

13. The method of claim 12, and including the steps of sensing the temperature in said stack at a position upstream of said location, supplying auxiliary heat to the heat exchanger when said temperature is below a preset value, sensing the direction of flow of waste gas in the auxiliary conduit at a second location between the stack and the heat exchanger, and controlling the flow of waste gas through the auxiliary conduit to maintain a substantially zero flow of waste gas at said second location to thereby insure that substantially all of the auxiliary heat is directed to the heat exchanger.

14. The method of claim 10, and including the step of sensing the temperature in said stack at a position upstream of said location, and performing said step of controlling the flow of waste gas when the temperature in said stack is above a predetermined value.

15. The method claim 11, and including the step of controlling the flow of waste gas through said conduit to maintain a pressure differential at said location in the range of 0.00 to 0.02 inch of water.

16. The method of claim 13, and including the step of controlling the flow of waste gas through said conduit to maintain a pressure differential at said second location in the range of 0.00 to 0.02 inch of water.

* * * * *